United States Patent
Meylan et al.

(10) Patent No.: US 8,553,526 B2
(45) Date of Patent: Oct. 8, 2013

(54) METHODS AND APPARATUS FOR DETERMINING QUALITY OF SERVICE IN A COMMUNICATION SYSTEM

(75) Inventors: Arnaud Meylan, San Diego, CA (US);
Manoj M. Deshpande, San Diego, CA (US); Ranjith Jayaram, San Diego, CA (US); Sanjiv Nanda, Ramona, CA (US); Vinay Sridhara, Santa Clara, CA (US); Alok Aggarwal, San Diego, CA (US); Norman Ko, San Diego, CA (US); Sendil Krishna, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 208 days.

(21) Appl. No.: 12/438,122

(22) PCT Filed: Sep. 28, 2007

(86) PCT No.: PCT/US2007/079995
§ 371 (c)(1),
(2), (4) Date: Feb. 19, 2009

(87) PCT Pub. No.: WO2008/040021
PCT Pub. Date: Apr. 3, 2008

(65) Prior Publication Data
US 2010/0165857 A1    Jul. 1, 2010

Related U.S. Application Data

(60) Provisional application No. 60/848,414, filed on Sep. 28, 2006, provisional application No. 60/848,415, filed on Sep. 28, 2006, provisional application No. 60/945,054, filed on Jun. 19, 2007.

(51) Int. Cl.
*H04J 1/16* (2006.01)

(52) U.S. Cl.
USPC ............................ 370/216; 370/252; 455/452.2

(58) Field of Classification Search
USPC ......... 370/216, 355, 252, 342, 209; 455/67.1, 455/69, 10, 452.2; 375/200, 336
See application file for complete search history.

(56) References Cited

U.S. PATENT DOCUMENTS

| 4,745,593 A | 5/1988 | Stewart |
| 5,477,531 A | 12/1995 | McKee et al. |

(Continued)

FOREIGN PATENT DOCUMENTS

| EP | 186343 A2 | 7/1986 |
| EP | 1026855 A2 | 8/2000 |

(Continued)

OTHER PUBLICATIONS

International Search Report dated Feb. 2, 2008 for PCT/US2007/079995.

(Continued)

*Primary Examiner* — Dady Chery
(74) *Attorney, Agent, or Firm* — Abdollah Katbab

(57) ABSTRACT

Methods and apparatus for determining the quality of service of a network are disclosed. A disclosed methodology for determining quality of service for a network includes determining at least two metrics reflective of network parameters in at least two different protocol layers of the communication network. The metrics are then compared with respective threshold values, and quality of service for the network is determined based on the comparison of the metrics with the respective threshold values. Corresponding apparatus executing the methodology are also disclosed.

64 Claims, 4 Drawing Sheets

(56) References Cited

U.S. PATENT DOCUMENTS

| | | | |
|---|---|---|---|
| 5,563,875 | A | 10/1996 | Hefel et al. |
| 5,825,761 | A * | 10/1998 | Tanaka et al. ............ 370/333 |
| 6,125,772 | A | 10/2000 | Clements |
| 6,215,772 | B1 | 4/2001 | Verma |
| 6,526,140 | B1 | 2/2003 | Marchok et al. |
| 6,539,205 | B1 * | 3/2003 | Wan et al. ............... 370/465 |
| 6,542,499 | B1 | 4/2003 | Murphy et al. |
| 6,728,217 | B1 | 4/2004 | Amirijoo et al. |
| 6,745,012 | B1 | 6/2004 | Ton et al. |
| 6,751,198 | B1 | 6/2004 | McPherson et al. |
| 6,798,745 | B1 | 9/2004 | Feinberg |
| 6,934,258 | B1 | 8/2005 | Smith et al. |
| 7,346,018 | B2 | 3/2008 | Holtzman et al. |
| 2002/0058537 | A1 | 5/2002 | Bhatoolaul et al. |
| 2002/0077786 | A1 | 6/2002 | Vogel et al. |
| 2002/0154602 | A1 | 10/2002 | Garcia-Luna-Aceves et al. |
| 2002/0194609 | A1 | 12/2002 | Tran |
| 2003/0031185 | A1 | 2/2003 | Kikuchi et al. |
| 2003/0043773 | A1 | 3/2003 | Chang |
| 2003/0058792 | A1 | 3/2003 | Shao et al. |
| 2003/0091028 | A1 | 5/2003 | Chang et al. |
| 2003/0115321 | A1 | 6/2003 | Edmison et al. |
| 2003/0142651 | A1 | 7/2003 | Matta et al. |
| 2004/0190507 | A1 | 9/2004 | Wu et al. |
| 2004/0246895 | A1 | 12/2004 | Feyerabend |
| 2005/0064821 | A1 | 3/2005 | Hedberg et al. |
| 2005/0122901 | A1 * | 6/2005 | Bonneville et al. ........ 370/229 |
| 2005/0143027 | A1 | 6/2005 | Hiddink et al. |
| 2005/0159166 | A1 * | 7/2005 | Jonsson et al. ............ 455/452.2 |
| 2005/0185653 | A1 | 8/2005 | Ono et al. |
| 2005/0227698 | A1 | 10/2005 | Nonin et al. |
| 2005/0243729 | A1 | 11/2005 | Jorgenson et al. |
| 2005/0281392 | A1 | 12/2005 | Weeks et al. |
| 2006/0034188 | A1 | 2/2006 | Oran et al. |
| 2006/0209686 | A1 | 9/2006 | Wigard et al. |
| 2006/0209758 | A1 | 9/2006 | Qiang et al. |
| 2007/0195702 | A1 | 8/2007 | Yuen et al. |
| 2009/0257361 | A1 | 10/2009 | Deshpande et al. |

FOREIGN PATENT DOCUMENTS

| | | |
|---|---|---|
| EP | 1026885 A1 | 8/2000 |
| EP | 1047223 A2 | 10/2000 |
| EP | 1253749 A2 | 10/2002 |
| EP | 1455490 A2 | 9/2004 |
| EP | 1463245 A2 | 9/2004 |
| EP | 1511247 A2 | 3/2005 |
| EP | 1531646 | 5/2005 |
| JP | 58085654 | 5/1983 |
| JP | 2000224172 A | 8/2000 |
| JP | 2001127795 | 5/2001 |
| JP | 2004032668 A | 1/2004 |
| JP | 2005244525 A | 9/2005 |
| JP | 2005269170 A | 9/2005 |
| JP | 2006197351 A | 7/2006 |
| KR | 20030023898 | 3/2003 |
| WO | WO9847308 A1 | 10/1998 |
| WO | WO0013321 A1 | 3/2000 |
| WO | WO0230042 A2 | 4/2002 |
| WO | WO0239673 A1 | 5/2002 |
| WO | WO2004006504 A1 | 1/2004 |
| WO | WO2004012403 A1 | 2/2004 |
| WO | WO2004082219 | 9/2004 |
| WO | WO2005055492 A2 | 6/2005 |
| WO | WO2005101740 A1 | 10/2005 |
| WO | WO2006044836 A2 | 4/2006 |
| WO | WO2006064278 A1 | 6/2006 |

OTHER PUBLICATIONS

Adachi M. et al., "NEPRI: Available Bandwidth Measurement in IP Networks", ICC 2000. 2000 IEEE International Conference on Communications. Conference Record. New Orleans, LA, Jun. 18-21, 2000; [IEEE International Conference on Communications]. New York, NY: IEEE, US, Jun. 18, 2000, pp. 511-515, XP001043000 USBN:978-0-7803-6284-0 p. 512-p. 513; figure 2.
Audio-Video Transport Working Group H Schulzrinne GMD Fokus S Casner Precept Software et al., RTP: A Transport Protocol for Real-Time Applications; rfc1889.txt, IETF Standard, Internet Engineering Task Force, IETF, CH, Jan. 1, 1996.
Written Opinion—PCT/US2007/079995, International Searching Authority—European Patent Office, Feb. 6, 2008.
Taiwan Search Report—TW096136495—TIPO—Oct. 4, 2011.

* cited by examiner

METHODS AND APPARATUS FOR DETERMINING QUALITY OF SERVICE IN A COMMUNICATION SYSTEM

CLAIM OF PRIORITY UNDER 35 U.S.C. §119

The present Application for Patent claims priority to Provisional Application No. 60/945,054, entitled "Handoff Algorithms for VoIP over WLAN" filed on Jun. 19, 2007, and claims priority to Provisional Application No. 60/848,415, entitled "Estimation of the Path Quality to Assist Handoff Decision" filed on Sep. 28, 2006, and claims priority to Provisional Application No. 60/848,414, entitled "Handoff Triggers for WLAN and VoWLAN" filed on Sep. 28, 2006 , all applications which are assigned to the assignee hereof and hereby expressly incorporated by reference herein.

BACKGROUND

1. Field

The present disclosure generally relates to methods and apparatus for determining the quality of a network, and more particularly to determining quality of service (QoS) of a specified local area network (LAN) and an associated network backhaul link for transmitted voice data (e.g., Voice over IP), which may be used for execution of corrective action to improve the QoS when specified parameters for the QoS are not met, as an example.

2. Background

In communication systems, the utilization of Internet Protocol (IP) telephony, such as end-to-end Voice over IP (VoIP) calls, is ever increasing. The routing between end points involved in such VoIP calls will typically access an IP network (e.g., the Internet) through any one or a combination of a number of different communication network technologies. Examples of types of network technologies used may include Wireless Local Area Networks (WLAN) such as Wi-Fi (IEEE Std. 802.11) and femtocells, or Wireless Wide Area Networks (WWAN) including cellular networks such as 1X-EVDO, High Speed Packet Access (HSPA), and other WWANs such as WiMAX (IEEE 802.16), and still other various known and to-be-defined network technologies. Accordingly, VoIP traffic may be exchanged over numerous networks in the routing between the end points. For example, in an end-to-end VoIP call between a user A and a user B in a residential setting, the VoIP packets can potentially traverse user A's Wi-Fi access network, user A's DSL or cable broadband, an IP core network, user B's DSL or cable broadband, and user B's Wi-Fi access network. It is axiomatic that as numerous networks are used to link the voice packets between the end points, a failure in the quality of service on any of these network links will affect the overall quality of service for the call.

Accordingly, it is known to determine quality of service (QoS) metrics of a communication link, and further to employ the QoS determination for taking action to improve the QoS, such as through handoff triggering for end devices from a communication link experiencing degradation of QoS to another communication link in order to maintain voice call continuity. In such systems, the QoS is typically monitored by one or both of the devices at the end points of a voice call (e.g., a mobile phone or a computer), since such devices are affected by QoS degradation occurring anywhere within the particular networks utilized to route the call.

A known metric for determining QoS in wireless local area networks (WLANs) is a determination or measurement of the received signal power in the downlink from a wireless access point (AP) to a communication device wirelessly linked to the AP. Accordingly, when the received signal power falls below a threshold value, an end device may, for example, trigger a handoff to another network, such as a wireless wide area network (WWAN) or another wireless local area network, if available. This physical (PHY) layer metric alone, however, is not efficacious for determining the total path quality for all situations and layers. For example, given a VoIP call occurring in a Wireless Local Area Network (WLAN), although the downlink radio signal strength is good for maintaining a high QoS, lost packets at the medium access control (MAC) or application layers will nonetheless adversely affect the actual QoS. Furthermore, degradation in the backhaul link from the WLAN access point to the call termination equipment will also adversely affect QoS, even though the WLAN radio signal strength is acceptable. Also, the Access Point may not receive similar power level from the communication device, resulting in a good link on the downlink and poor link on the uplink, which can not be detected by the device. Good WLAN quality, for example, requires thorough monitoring of the various points of failure (i.e., various metrics) and triggering of a handoff to another radio technology as soon as the WLAN or accompanying backhaul shows signs of failure. Accordingly, there is need for a mechanism to accurately assess the QoS at a communication terminal for the various metrics affecting the call path, thus affording optimization and convergence on the best communication protocol for a user in order to provide for seamless transit between networks and/or protocols.

SUMMARY

According to an aspect, a method for determining quality of service for a communication network is disclosed. The method includes determining at least two metrics reflective of network parameters in at least two different protocol layers of the communication network and comparing the at least two metrics with respective threshold values. The method further includes determining quality of service for the network based on the comparison of the at least two metrics with the respective threshold values.

According to another aspect, an communication device operable in a communication system is disclosed. The device includes a processor having a first module to determine at least two metrics reflective of network parameters in at least two different protocol layers of the communication network. The processor also includes a second module to compare the at least two metrics with respective threshold values, and a third module to determine quality of service for the network based on the comparison of the at least two metrics with the respective threshold values.

According to still another aspect, an apparatus for determining the quality of a communication link is disclosed. The apparatus includes means for determining at least two metrics reflective of network parameters in at least two different protocol layers of the communication network. The apparatus further includes means for comparing the at least two metrics with respective threshold values and means for determining quality of service for the network based on the comparison of the at least two metrics with the respective threshold values.

According to still another aspect, a computer program product comprising a computer-readable medium is disclosed. The computer-readable medium includes code for causing a computer to determine at least two metrics reflective of network parameters in at least two different protocol layers of the communication network. The medium further includes code for causing a computer to compare the at least two metrics with respective threshold values, and code for causing a computer to determine quality of service for the network based on the comparison of the at least two metrics with the respective threshold values.

DETAILED DESCRIPTION

According to certain aspects, methods and apparatus are disclosed for determining quality of a communication link and handoff triggering based on that determination. The determination of quality may include monitoring downlink and uplink metrics from at least two or more different layers of protocols, such as PHY, MAC, or application layers. According to still further aspects, triggering a handoff between different networks is effected based on the quality determination.

Figure 1:
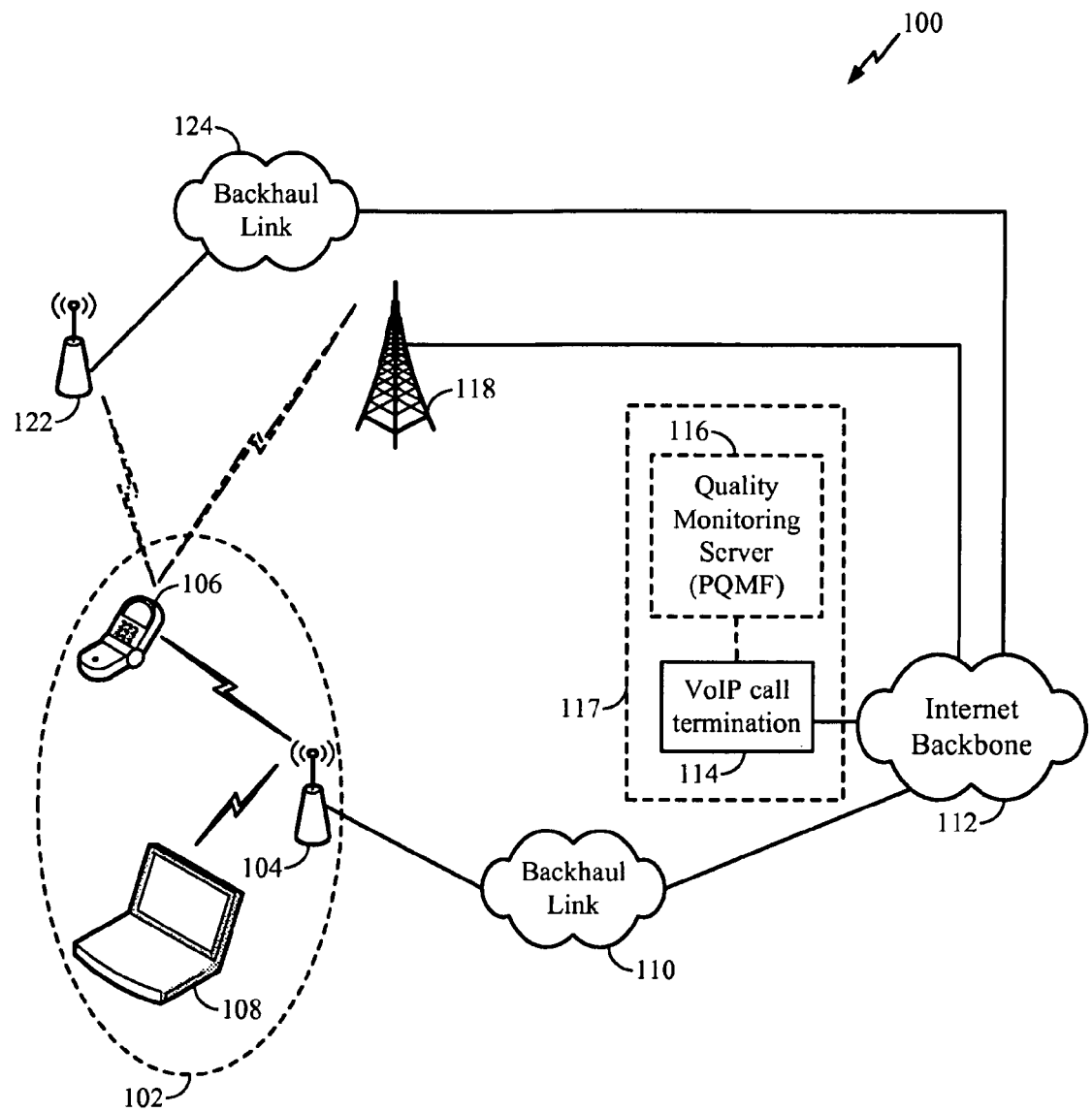
FIG. 1 is a diagram of a communication system that employs quality determination and triggering of action to improve quality of service.

FIG. 1 is a diagram of an exemplary communication system 100 employing quality determination and an accompanying execution of corrective action to improve quality, such as handing off, based on the quality determination. As will be detailed, system 100 is useable for making VoIP calls between two end points (e.g., two communication terminals or stations). System 100 may include a local area network 102, such as a wireless local area network (WLAN) 102, which may operate according to any one of numerous wireless networking standards, such as Wi-Fi (IEEE Std. 802.11). The local area network 102 includes a wireless access point (AP) 104 that communicates with communication terminal end points, such as a mobile device 106 or other electronic devices including a computer 108. AP 104 is, in turn, in communication with a backhaul link 110.

Backhaul link 110 may comprise any one of a number of types of network connections, such as a digital subscriber line (DSL) or a cable broadband connection. The backhaul link 110 serves to communicatively couple the local area network 102 with a wide area network, such as an Internet backbone 112. In particular, the backhaul link is terminated at a call termination unit 114, which communicates with Internet backbone 112. The internet backbone 112 is used to transmit VoIP packets to another end terminal (not shown) of the end-to-end connection.

System 100 also may include a path quality monitoring function server 116, which is used to assist in determining a QoS of the communication link between a terminal 106, for example, and the call termination 114. As will be described in more detail herein, a path quality monitoring function (also referred herein with the acronym "PQMF") may be effected by a terminal or station (e.g., mobile communication device 106), that transmits packet information over the networks in the VoIP connection to a quality monitoring server 116 located near or in a call termination unit as diagrammatically represented by dashed box 117. In response to a packet from the terminal, for example, the quality monitoring server 116 returns packet information back to the terminal or station for determination of the path quality. The concept of PQMF and exemplary implementations of PQMF are more fully described in co-pending application entitled "METHODS AND APPARATUS FOR DETERMINING COMMUNICATION LINK QUALITY" by Deshpande et al., having Ser. No. 12/439,059, filed concurrently herewith, assigned to the assignee hereof, and expressly incorporated by reference herein.

System 100 may also include one or more alternative networks to which a communication terminal or station handoffs in the event that the quality of the WLAN 102 or backhaul link 110 degrades. For example, the terminal 106 may handoff to a WWAN network as exemplified by base station 118. The WWAN network may consist of any of a number of suitable networks such as cellular networks including CDMA, GSM, WiMax (IEEE 802.16), LTE, UMB, 1x-EVDO, UMTS, HSPA, networks, or any other suitable wireless or wired network. The base station 118, in turn, the internet link 112 for transmission of traffic (i.e., voice traffic) to the call termination unit 114.

Another alternative handoff network may be another WLAN access point AP 122, if within range of the communication terminal 106. AP 122 then connects traffic from communication terminal 106, for example, via a corresponding backhaul link 124 to the Internet 112 to call termination unit 114. Although not shown, the VoIP call termination may also be located near an associated PQMF server, similar to server 116.

System 100 is illustrative of a single, simple network configuration. Many additional, more complex configurations of system 100, however, are contemplated, including alternative electronic devices and various wireless and wired networking protocols. Additionally, components in system 100 can be configured to facilitate the mobile communication terminal 106, for example, seamlessly switching between an AP currently being utilized by the terminal 106, to another network. Moreover, although system has been described specifically in connection with a QoS determination for voice data (VoIP), it is contemplated that the QoS determination may be utilized for other packet transmissions over the backhaul, such a broadband data services.

Figure 2:
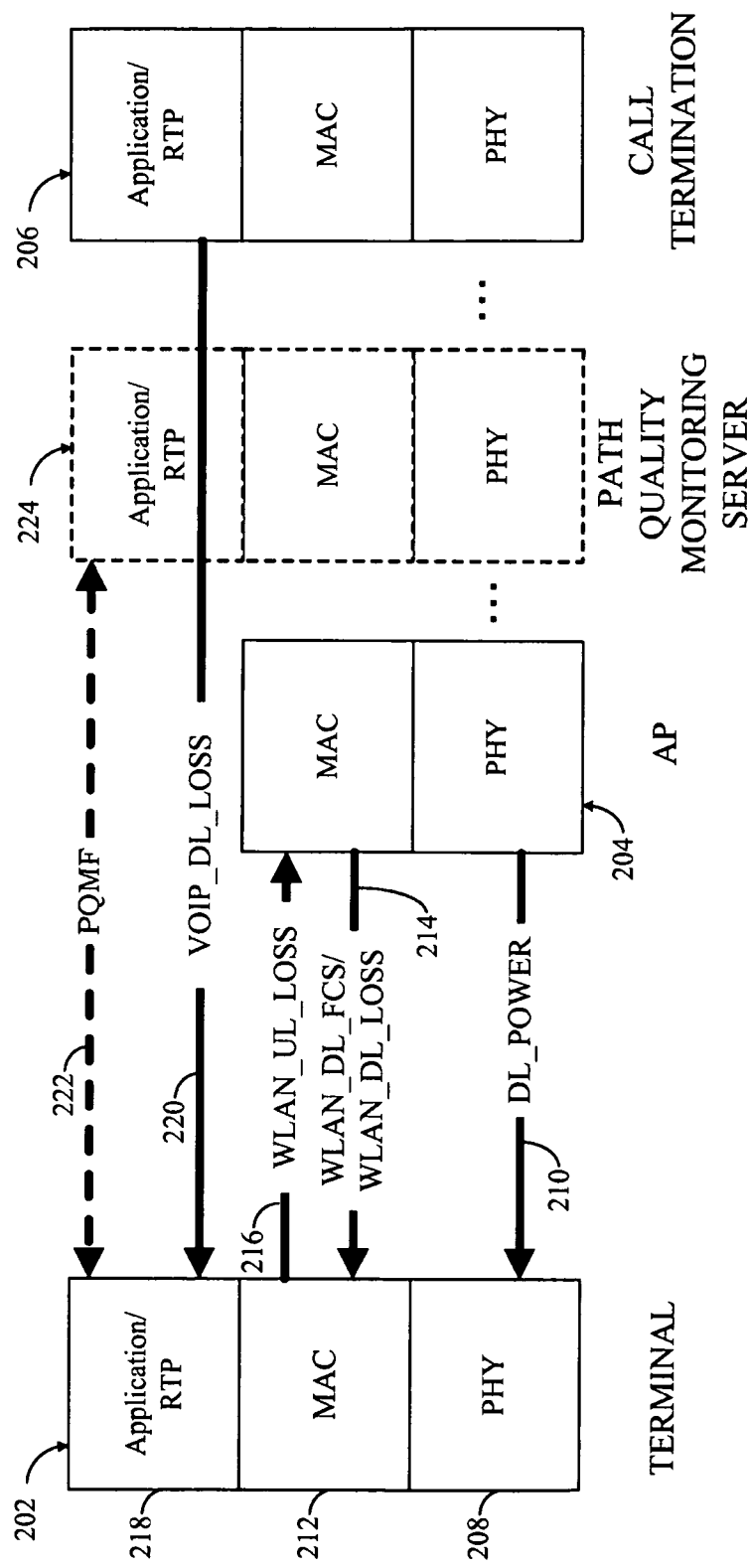
FIG. 2 is a block diagram illustrating the levels on which quality determination or monitoring metrics are performed in communication system

FIG. 2 illustrates a block diagram illustrating protocol layers on which quality determination or monitoring metrics are performed in a communication system, such as system 100 in FIG. 1. An end point terminal 202 participating in a VoIP call may be configured to monitor different metrics on various layers that affect QoS. As will be described, communication terminal 202 is capable of monitoring protocol layer parameters such as a physical layer (PHY), Medium Access Control (MAC) layer, and application layer parameters or metrics on the link between the terminal 202 and an access point 204, as well as a VoIP call termination 206. The communication terminal 202 is similar to communication terminal devices 106 or 108 illustrated in FIG. 1.

At the PHY layer 208, one measured metric may include, for example, the signal power of a received wireless signal from an access point (AP) 204. For a wireless access point, in particular, the Received Signal Strength Indicator (RSSI) may be utilized for determining this metric. According to an example, in a Wi-Fi 802.11 wireless LAN, an average of RSSI samples received over a predefined time period (termed herein as $T_{PWR}$) may be determined or calculated. This average is defined herein as the downlink power (DL_PWR) and is indicated by reference number 210 in FIG. 2. It is noted that during downlink silence in VoIP call, no RSSI update is able to be provided by the Data frames of the VoIP stream. However, collected RSSI samples by communication terminal 202 may correspond to any type of frame originated by the access point (AP) 204, not just the VoIP Data frames. In addition the terminal 202 may use frames that are not destined to itself in order to update the RSSI. The signal to interference and noise ratio (SINR) may also be used, when available, which affords an accounting for the interference and noise that affect the ability to decode frames.

The terminal 202 is configured to utilize the downlink power or SINR metric for purposes of triggering a handoff or other corrective action, such as changing the data or coding rate, when a predetermined threshold is crossed. In the case of a Wi-Fi 802.11 access point, for example, the threshold can be empirically established based on the data rate of the AP 204 and the sensitivity of the receiver hardware at the terminal 202.

Terminal 202 may include monitoring of the MAC layer, as indicated by layer 210. At the MAC level, it is possible to determine both downlink and uplink metrics with the terminal 202.

Concerning MAC layer downlink metrics, several distinct metrics are contemplated for purposes of determining the QoS. These metrics, indicated by arrow 214 and 216 in FIG. 2, relate in general for the downlink to determining frame check sequence (FCS) errors and missing or retransmitted frames and for the uplink to determining the loss rate and retransmit rate. Additionally, it is noted that these metrics can be implemented using the 802.11 MAC management information base (MIB) as well as information from the local buffers, including buffer overflows.

A first downlink metric that may be utilized concerns monitoring the number of frames received with FCS errors. This metric may provide an indication on the downlink channel conditions. The metric can be used to detect channel degradation before downlink packet losses occur, and may possibly accelerate the search for a handoff target or initiate some other action to improve link quality. It is noted, however, that this metric may fail to alert in very rapidly changing scenarios where after a quick increase in path loss or interference level the frames may not even be detected by the PHY layer and therefore no FCS error occurs.

According to an example in a Wi-Fi network (IEEE 802.11), a ratio of the change in downlink FCS error count to the change in total received fragment count, herein termed "WLAN_DL_FCS", can be quantitatively defined according as follows:

$$\text{WLAN\_DL\_FCS} = \frac{\Delta dot11FCSErrorCount}{\Delta dot11ReceivedFragmentCount} \quad (1)$$

where the change or $\Delta$ of both the FCS error count and received fragment count is computed on the MAC MIB counter values over a past MIB time ($T_{MIB}$) interval. WLAN_DL_FCS is disabled during silence since no new frames are received and neither MAC MIB counter changes. Dot11FCSErrorCount is the MAC MIB Value counting FCS errors. Dot11ReceivedFragmentCount is the MAC MIB value counting the number of fragments received A second MAC downlink metric that may be used is a lower MAC computation of the ratio of packets that are not delivered properly (i.e., missing packets). This ensures the MAC downlink is monitored whatever the application is being used. The metric, which is termed "WLAN_DL_LOSS", is defined as the ratio of MAC Service Data units (MSDUs) that fail to be delivered to the upper MAC layer by the lower MAC layer. This ratio may be defined according to the following relationship:

$$\text{WLAN\_DL\_LOSS} = \frac{\Delta notRecievedMSDU}{\Delta MSDU\_sequence\_number} \quad (2)$$

where $\Delta$MSDU_sequence_number represents a fixed window size of MSDUs and $\Delta$notReceivedMSDU is the number of frames not received within the window of $\Delta$MSDU_sequence_number. It is noted that in implementing WLAN_DL_LOSS, a sender (e.g., AP 204) uses MAC sequence numbers that are incremented by one (or at least a fixed known amount) for each new MSDU for each destination terminal. It is noted that this metric may not accurately assess the lost packets when the channel degrades rapidly, as no new frame may be received. Of further note, the WLAN_DL_LOSS metric may also be disabled during call silence since no new sequence number or MDSUs will be detected during silence.

In systems featuring rate adaptation such as 802.11, a third MAC metric useable for measuring link quality is the rate currently selected by the Access Point. A low rate may indicate that the link is degraded.

The above-described MAC layer metrics may be used for taking corrective action to improve the communication link quality. In one example, corrective action may include triggering a handoff of the terminal 202 when one more trigger thresholds have been crossed. A trigger threshold for the WLAN_DL_FCS could be set to 50%, as an example, which means that if half of the received frames failed the FCS, a corrective action would be triggered. A trigger for the WLAN_DL_LOSS metric for voice calls could be, for example, a prescribed percentage beyond which the Mean Opinion Score (MOS), a measure of perceptual voice quality, degrades significantly. For data sessions, this could be a prescribed percentage beyond which, for instance, the Transmission Control Protocol (TCP) fails to achieve reasonable throughput. As an example of how to establish a prescribed percentage, it is noted that a typical codec output is 50 frames per second and the average window size is 1 second. Accordingly, if the WLAN_DL_LOSS threshold percentage were set at 6%, for example, this would correspond to 3 missing packets per 1 second window and would allow some tolerance to bursts of errors.

It is also noted that the above MAC downlink metrics are not necessarily usable for call silence periods since no data is downloaded. Accordingly, in an example, reliance would fall on other metrics besides the MAC downlink metrics during call silence periods to make quality determinations. In another example, the MAC downlink metrics are not used for triggering corrective action due to inherent limitations, but merely inform triggering based on other additional metrics. The limitations, for instance, include that the FCS metric may fail to alert in very rapidly changing scenarios where after a quick increase in path loss the frames may not even detected by the PHY and therefore no FCS errors happen. Additionally, the MSDU-based metric should not be used when access points (APs) send packets with discontinuous MAC sequence numbers. Therefore the station must first detect if the AP 204 sends continuous sequence numbers before enabling the metric.

Along the uplink path from end terminal 202 to a terminal at the other end of a voice call (not shown) there exist numerous points of potential failure or degradation such as the WLAN uplink, the broadband backhaul, the operator network (e.g., IP network), and the final link to the other end terminal. Monitoring of the WLAN uplink by the terminal 202 is relatively easy compared with the other portions of the link. Furthermore, monitoring the WLAN uplink can uncover degradation due to losses caused by overload of the WLAN or interferers location close to the WLAN access point (e.g., AP 204). Accordingly, the present apparatus and methods also provide monitoring of uplink metrics by the terminal 202 at the MAC layer, as illustrated by arrow 216 in FIG. 2.

According to a particular aspect, the presently disclosed apparatus and methods may utilize a constructed WLAN uplink loss (WLAN_UL_LOSS) metric defined as follows:

$$WLAN\_UL\_LOSS = UL\_HOST\_LOSS + WLAN\_UL\_MAC\_LOSS \quad (3)$$

UL_HOST_LOSS in equation (3) above represents a percentage of frames lost in the host (e.g., terminal 202) buffers (e.g., buffer overflows) computed over a past time interval ($T_{MIB}$). Quantitatively, UL_HOST_LOSS can be determined according to the following relationship:

$$UL\_HOST\_LOSS = \frac{\Delta MSDU\_lost\_host}{N_{ExpectedFrames}}. \quad (4)$$

where $N_{ExpectedFrames}$ represents the expected number of frames output by the terminal codec during a $T_{MIB}$ interval. It is noted that buffers used for VoIP traffic queuing in the terminal 202 do not contain more than a time threshold of outgoing data, such as approximately 240 ms, for example, which would correspond to approximately 12 frames of data. If the data exceeds this queue amount, the delay will be too large and frames exceeding the delay are dropped. These dropped frames are recorded and the change therein is represented by $\Delta MSDU\_lost\_host$ in equation (4) above.

The value WLAN_UL_MAC_LOSS in equation (3) above represents a percentage of frames lost over the air, it is computed every $T_{MIB}$ as follows:

$$WLAN\_UL\_MAC\_LOSS = \frac{\Delta dot11FailedCount}{\Delta dot11TransmittedFrameCount + \Delta dot11FailedCount} \quad (5)$$

In each case in equation (5) the Δ of the Failed count and Transmitted Frame Count are computed on the MAC MIB counter values over the past $T_{MIB}$ interval. Dot11FailedCount is the name of the MAC MIB counter counting the number of frames that failed to be transmitted after the maximal amount of attempts. Dot11TransmittedFrameCount is the name of the MAC MIB counter counting the number of frames transmitted by the station.

Concerning a threshold value of metric WLAN_UL_LOSS for quality determination and triggering, it is noted that empirically it is known that above a value of approximately 6%, the VoIP Mean Opinion Score (MOS) degrades significantly. Accordingly, because a typical codec output 50 fps and the average window is 1 second, an exemplary value for the uplink loss metric could be set at 6%, which corresponds to 3 missing packets and allows some tolerance to bursts of errors.

It is noted that during silence periods, the small number of transmitted frames make it difficult to accurately estimate the uplink loss rate. For example, the loss of one frame out of three during a silence period would indicate an overly pessimistic 33% uplink loss rate. To compensate, PQMF is used to test the link quality if less than a threshold number of packets are observed during the $T_{MIB}$ interval.

According to a particular aspect, the presently disclosed apparatus and methods may utilize the average number of retransmissions required to transmit a frame and the percentage of frames that require at least one retransmission on the uplink It is also noted that the 802.11 MAC MIB contains a number of other metrics that are useful for monitoring the uplink QoS, including, for example, counters for acknowledgement failures and retried packets. These metrics can be used to define handoff triggers in the same way as the failed count illustrated above.

It is also noted that while an implementation is described using the MAC MIB values, the same implementation may be accomplished without querying the MAC MIB. Instead, the metrics may be computed directly within the MAC. Furthermore, an uplink data rate can be used as well, similar to the use described above for Downlink.

As described above, terminal 202 may monitor PHY and MAC layer metrics to determine if the wireless link is degraded, especially in the case of a WLAN. For other network pathologies, however, monitoring at higher levels can assist a terminal (202) to determine whether problems exist in the backhaul, for instance. Accordingly, the terminal 202 may also monitor metrics of protocols using the services of the MAC, illustrated as an "application" or RTP layer 218. In the particular example of FIG. 2, the application layer metrics monitored relate to the monitoring of downlink loss of VoIP traffic, shown as VOIP_DL_LOSS 220 in FIG. 2.

A goal of the application layer downlink loss metric VOIP_DL_LOSS is to reflect the quality of the audio stream heard by a user. Hence, the metric is configured to monitor the fraction of packets erased as perceived by the audio decoder, at the output of the jitter buffer. Stated another way, this metric can be thought of as a percentage of packets not reaching a decoder in time for play out over a predetermined time interval. It should be noted that "packet," in this context, is defined as the payload of an RTP packet, whereas "frame" refers to the content of the framing unit used a codec. A packet may contain, for example, information used to reconstruct several frames, such as a silence packet.

In particular, this metric may be defined quantitatively according to the following relationship:

$$VOIP\_DL\_LOSS = 1 - \frac{N_{RecievedFrames}}{N_{ExpectedFrames}} \quad (6)$$

where $N_{ExpectedFrames}$ is a count of the number of frames expected by the decoder over a measurement time interval $T_{VOIP}$, and $N_{ReceivedFrames}$ is a count of the number of frames actually received. Both of these frame counts may be updated based on the RTP sequence numbers of the packets played at the jitter buffer output.

It is noted here that the metric VOIP_DL_LOSS works well with continuous codecs such as G.711, where $N_{ExpectedFrames}$ is the same in each measurement interval $T_{VOIP}$. For discontinuous codecs with periodic silence frames, such as AMR, EVRC, and EVRC-B, the frame counters may increment slowly during silence periods and, thus, may yield a less accurate estimate of the downlink quality. For example, losing one frame out of three during silence would show an overly pessimistic 33% loss rate. The VOIP_DL_LOSS metric will not update at all for codecs that completely stop transmitting frames during silence, and thereby fail to comply with the recommendation of RFC 3551, such as certain implementations of G.711. In such cases, the present apparatus and methods may be further configured to ignore the VOIP_DL_LOSS metric (based on a small number of expected frames in the $T_{VOIP}$ interval), and reliance placed elsewhere, such as on PQMF, to accurately monitor the link quality.

It is noted that there still may be cases where use of the above-metrics to assist in deciding whether to trigger a handoff may not improve QoS and can introduce needless overhead. For example, assuming the source of quality problems is occurring on a remote side (i.e., after the call termination 206), the application layer metric may nonetheless indicate a large download packet loss, even though the local LAN and backhaul link is good. Thus, triggering a handoff to another network as result of such detection will not yield an improvement since the problem is at the remote end. Such a handoff introduces needless overhead and obviates the potential advantages of retaining the call on the LAN. A subscriber may like to retain the call on the LAN for cost as well as performance reasons. Conversely, the application layer metric may indicate negligible download packet loss, while the backhaul uplink is degraded causing problems to the remote side. Thus, the lack of a triggered handoff away from the local LAN will result in continued degradation of QoS for the remote side. As yet another example, a handoff from a WAN to the local LAN may be indicated based on a suitably detected RSSI. If the backhaul quality is degraded, however, a handoff to the local LAN would cause packet loss after handoff in such a case. In addition, many of the above-described metrics are disabled during silence.

Accordingly, a path quality monitoring function (PQMF) 222 as illustrated in FIG. 2 may be utilized to more accurately assess the quality determination and trigger handoff. The functionality to detect the path quality degradation resides in the terminal (e.g., 202) and may be implemented through software, hardware, or a combination thereof. The terminal 202 exchanges a packet with the PQMF server 224 located upstream near call termination 206. Placement of the PQMF server 224 at the upstream broadband termination facilitates effective broadband monitoring (i.e., monitoring of the backhaul) and all the traffic emanating from the terminal 202 (signaling as well as the bearer) is guaranteed to traverse through to the call termination 206.

It is noted that in addition to curing the above-noted situations where the other metric may fail to provide accurate assessment of quality for handoff, the PQMF is robust during silence. Further detailed description of PQMF is available in the copending application entitled "METHODS AND APPARATUS FOR DETERMINING COMMUNICATION LINK QUALITY" by Deshpande et al., Ser. No. 12/439,059, and incorporated herein by reference.

Referring to FIGS. 1 and 2, it noted that the communication terminals 106 or 202 can be configured to measure the signal strength to a nearest base station (e.g., 118) of another potential handoff network when deciding whether to handoff to that network. Accordingly, assuming an alternate cellular system is available, and a WAN signal strength is above a signal to noise ratio threshold $SNR_{AddThreshold}$, the handoff algorithm coding could be as follows:

If( RSSI < $RSSI_{DropThreshold}$ )
    Handoff due to low Wi-Fi signal strength Else if( WLAN_UL_LOSS > $PER_{ExitThreshold}$ )
    If( Number UL packets transmitted < $N_{MinULPacketSamples}$ )
        Send $N_{Fast}$ PQMF packets spaced $T_{FastInterval}$ apart and measure
        their RTT
        Handoff if more than $N_{FastLossThreshold}$ packets have RTT >
        $T_{FastTimeout}$
    Else
        Handoff due to poor local Wi-Fi uplink
    End
Else if( VOIP_DL_LOSS > $PER_{ExitThreshold}$ or PQMF RTT > $T_{SlowTimeout}$ )
    Send $N_{Fast}$ PQMF packets spaced $T_{FastInterval}$ apart and measure their RTT
    Handoff if more than $N_{FastLossThreshold}$ packets have RTT > $T_{FastTimeout}$
Else
    Retain call on Wi-Fi
End
    RTT is the round trip time of the PQMF packets or frames.

It is noted that the above algorithm utilizes metrics from the PHY (downlink), MAC (uplink), and application (downlink) protocol layers, as well as use of the PQMF. It is contemplated, however, that the utilization of metrics from only two protocol layers for practice of the presently disclosed apparatus and methods. For example, metrics from the PHY layer and MAC layers may be utilized to determine QoS and resultant corrective actions including handoff decisions. In other examples, metrics from the PHY and application layers (including PQMF) may be used in concert, or solely the MAC and application layers may be utilized for quality and corrective actions determinations. In this vein, FIG. 3 illustrates an overarching methodology for how the above-described metrics may be utilized together in a communication system.

Figure 3:
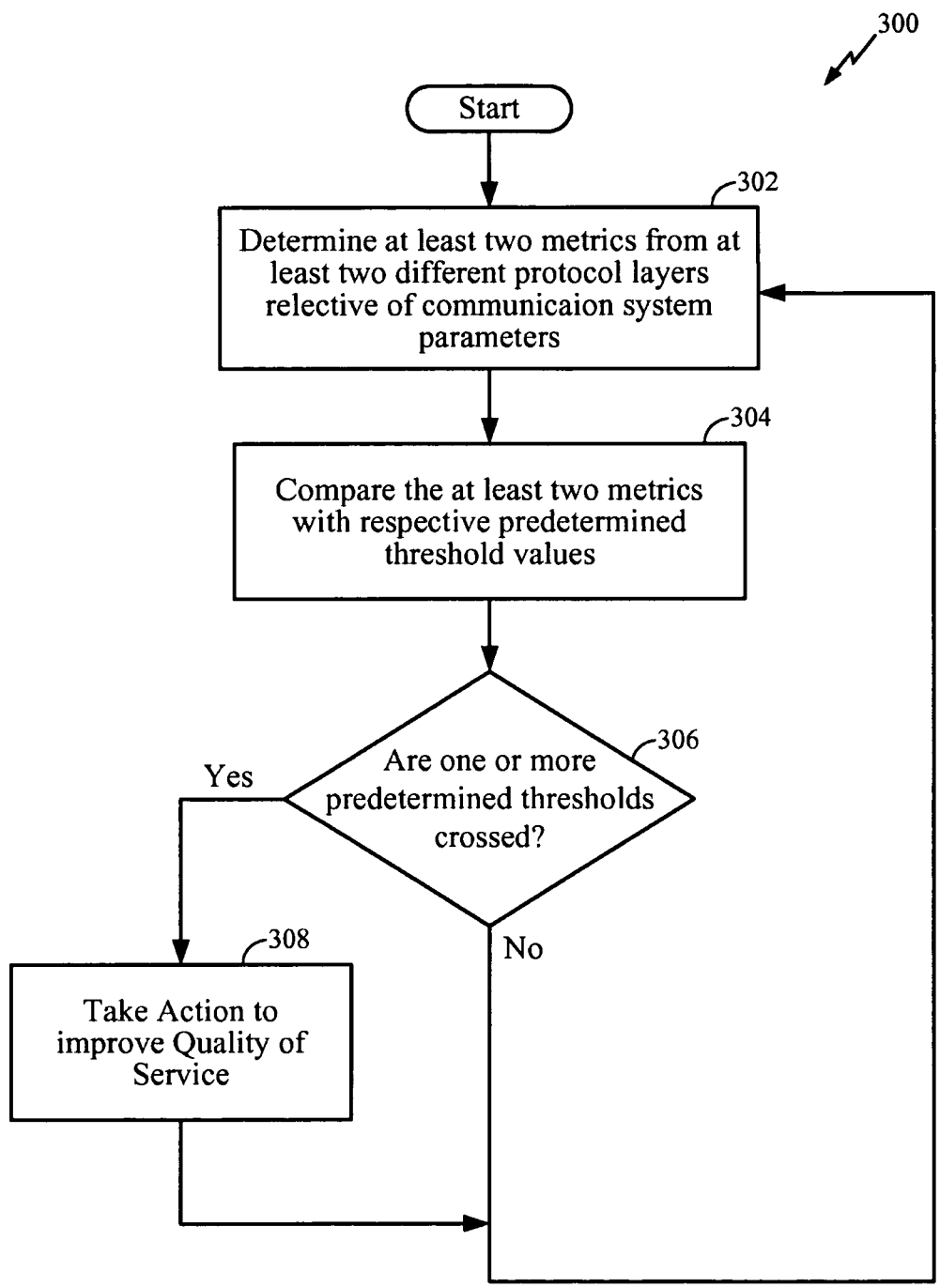
FIG. 3 is a flow diagram of a method for determining communication link quality in a communication system.

FIG. 3 is a flow diagram of a method 300 for determining communication link quality in a communication system that may be effected in a communication system, such as the systems in FIG. 1 or 2. More particularly, the method 300 may be performed by a communication terminal, such as terminals 106, 108, or 202. It is noted that for instances where PQMF is used with method 300, the assistance of a PQMF server, such as servers 116 or 224, or an equivalent device or functionality, may be employed.

After initialization, the method 300 determines at least two metrics from at least two different protocol layers reflective of communication system parameters in a communication terminal as shown in block 302. It is noted that the protocol layers are at least two of the PHY, MAC, and application (which may include PQMF) layers and determine may be performed by a communication terminal (e.g., 106 or 202). Additionally, the metrics include at least any of the metrics described previously herein. Determination of which two layers are utilized is determined by the logic within the communication terminal.

After determination of the at least two metrics in block 302, The determined metrics are compared with respective threshold values as shown in block 304. As described in detail above, the different threshold values for the respective metrics may be predetermined based on empirical considerations of what constitutes a sufficient QoS, as well as theoretical determinations dependent on the particular communication network. The threshold values may alternatively be determined adaptive to conditions within the communication system.

After comparing the metrics with the thresholds, flow proceeds to decision block 306. At block 306, a determination is made whether the comparison of block 304 reveals crossing of one or more predetermined thresholds. In other words, a QoS determination is made based on whether one or more of the metrics has crossed a predetermined threshold. If at least one threshold is crossed, flow proceeds to block 308, where appropriate action is taken to improve QoS. In an example, action taken may include a terminal triggering a handoff from the current network (e.g., a WLAN) to another network (e.g., WWAN), provided another network is available. Other examples of appropriate or corrective action to improve QoS may include adapting the coding rate and modulation, managing interferences, increasing transmit power, enabling multiple input-multiple output (MIMO), dropping the call, and requesting a higher QoS from the call service provider or broadband provider, some of which are discussed in more detail in the following discussion.

Adapting the modulation and coding rate may be accomplished by the communication terminal (e.g., 106 or 202) on its own for uplink transmissions. For the downlink, the terminal may use a special message to indicate to the access point how modulation and coding shall be adapted to improve QoS. If available, a closed loop rate control may be used in order to maximize the QoS of the link.

Managing interference may be accomplished by relocating the transmissions to another radio channel. The terminal may request the access point to change the current channel as supported in the 802.11v specification. The terminal may also use techniques knows as interference cancellation. A reason for not using interference cancellation all the time, however, is that it is CPU intensive, and therefore reduces battery life, which is of particular concern in mobile devices. Managing interference may also be used by reserving the medium for transmissions as performed by the request to send (RTS) and clear to send (CTS) messages. The terminal may request the access point to use a centralized scheduling scheme, such as the point coordination function (PCF) or the power save multi poll (PSMP) of 802.11 in order to reduce interferences as well.

Similarly, enabling MIMO transmission may provide for more reliable link with possible higher costs in CPU processing, bandwidth, protocol overhead. Moreover, requesting a higher QoS may take the form of re-negotiation of the radio bearer used for the communication. Depending on the system, this may mean transferring the call from a toll-free service to a toll service.

The transmit power may also be adapted by the terminal should it discover that the uplink is experiencing outage conditions, such as when the WLAN_UL_MAC_LOSS increases. Increased transmit power yields a higher SINR at the receiver and generally increases the QoS of the link. Further, when the station detects downlink outage such as when DL_LOSS raises, the station may request the access point to use increased transmit power with a special message.

Turning back to FIG. 3, alternatively at block 306, if none of the thresholds has been crossed, this indicates that the current network QoS is adequate for the network traffic (e.g., VoIP traffic), and no corrective action is made at that time. It is noted that the processes of blocks 306 and 308 may be also characterized as simply determining the QoS for the network based on the comparison of the at least two metrics with the respective threshold values.

After the processes of either block 306 or 308, flow returns to block 302 for repeat of the process 300 in order to continually monitor or determine QoS. It is noted that the process may be periodic where a delay period (not shown) occurs between the loop back to block 302 from either block 306 or 308. In another alternative, the process 300 may simply be executed once.

Figure 4:
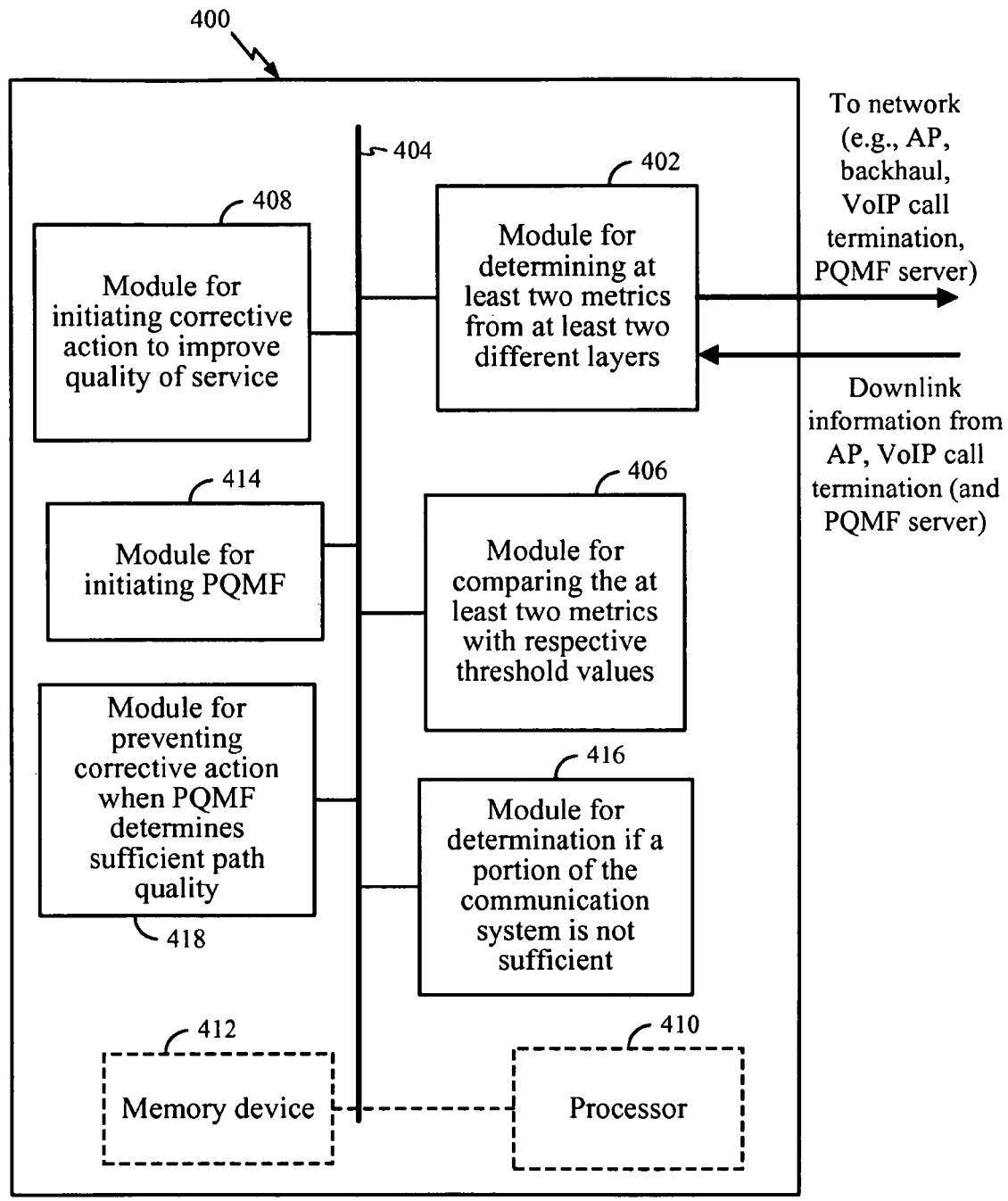
FIG. 4 illustrates an exemplary apparatus for determining the quality of service of a communication link and determining corrective action based on the quality.

FIG. 4 illustrates an exemplary apparatus for determining the QoS of a communication link and determining handoff based on the quality. It is noted that apparatus 400 may be configured as either a communication terminal, such as terminal 106, 108, or 202 in FIGS. 1 and 2, or as a processor or similar device for use within such communication terminals. As illustrated, apparatus 400 includes a module 402 for determining at least two metrics from at least two different protocol layers, such as metrics from the PHY, MAC, or application layers. As may be seen in FIG. 4, arrows output from and input to module 402 are an exemplary representation of monitoring and determination of metrics in the PHY (downlink), MAC (uplink and downlink), and application (downlink) layers including the sending of packets to a PQMF server, such as server 224, and reception of responsive packets from the PQMF server.

Information concerning the at least two metrics determined by module 402 are communicated via a bus 404, or similar communication coupling, to a module 406. Module 406 is used for comparing the at least two metrics with respective predetermined threshold values, as discussed in detail in connection with FIG. 2. Based on the comparison, determinations of QoS may be garnered. The resultant QoS based on the comparisons with the thresholds, may then be passed via bus 404 to a module 408 execution of corrective action based on the determined quality from module 406. As discussed previously, examples of corrective action may include, but are not limited to, handoff, adapting the coding rate and modulation, managing interferences, increasing transmit power, enabling multiple-input multiple-output (MIMO), dropping the call, and requesting a higher QoS from the call service provider or broadband provider.

Furthermore, the apparatus 400 may optionally include a processor 414, which may effect initiation and scheduling of the processes performed by the modules when apparatus 400 represents a terminal device. Also, the apparatus may include an optional computer readable medium or memory device 412 configured to store computer readable instructions for effecting the processes of the modules or the methods disclosed herein with optional processor 400, in the case where apparatus 400 is implemented as a terminal device, not merely a processor for use in such a device.

It is noted that the apparatus 400 may further include a module 414 to execute a path quality monitoring function (PQMF) when at least one of the at least two metrics indicates a poor quality of service. Moreover, a module 416 for determining whether a portion of the communication system is the source of insufficient or poor quality using the PQMF, Further, yet another module 418 may also be included to prevent execution of corrective action, such as corrective action initiated by module 408, when the path is sufficient quality; i.e., the poor quality is determined by the PQMF as not being caused by a portion of the communication system In light of the above discussion, it can be appreciated that the presently disclosed methods and apparatus afford an accurate determination of QoS, which, in turn, provides more accurate corrective action, such as handoff decisions. In particular, by determining metrics for at least two different layers in a communication terminal, an increased accuracy is engendered.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

The invention claimed is:

1. A method for determining quality of service for a communication network, the method comprising:
   determining at least two metrics reflective of network parameters in at least two different protocol layers of the communication network, wherein one of the at least two metrics is based on a signal received by a receiver, and wherein the at least two metrics include metrics respectively representing an application layer and a path quality monitoring of a communication path from a terminal to a termination;
   using a processor for comparing the at least two metrics with respective threshold values, wherein one of the respective threshold values is based on a data rate of an access point of the network and a sensitivity of the receiver; and
   determining quality of service for the network based on the comparison of the at least two metrics with the respective threshold values.

2. The method as defined in claim 1, further comprising:
   executing a corrective action to improve QoS based on the quality of service determination.

3. The method as defined in claim 2, wherein executing corrective action includes one or more of initiating a handoff of a communication terminal from the communication network to another communication network, adapting the coding rate and modulation, managing interferences, increasing a transmit power, enabling multiple input-multiple output (MIMO), dropping a current call, and requesting a higher QoS from a call service provider.

4. The method as defined in claim 3, wherein the another communication network is one of a wireless wide area network or a wireless local area network.

5. The method as defined in claim 2, further comprising:
   executing a path quality monitoring function when at least one of the at least two metrics indicates a poor quality of service;
   determining whether a portion of the communication system is causing the poor quality using the path quality monitoring function; and
   preventing execution of corrective action when the poor quality is determined as not being caused by a portion of the communication system.

6. The method as defined in claim 1, wherein the at least two metrics further include metrics respectively representing a physical layer and a MAC layer.

7. The method as defined in claim 6, wherein the metric representing a physical layer includes measurement of a received signal power or a signal to interference and noise ratio over a number of samples received, the samples corresponding to at least one of data, control, or management frames originated by an access point.

8. The method as defined in claim 6, wherein the metric representing a MAC layer include a downlink of the MAC layer, and further includes one or more of measuring of a fraction of frames received with an error and calculating a ratio of packets not received properly.

9. The method of claim 6, wherein the metric representing a MAC layer include a uplink of the MAC layer, and further includes calculating a percentage of frames lost in a buffer or application of a communication terminal and a percentage of frames lost over the air and the average number of retransmissions required to transmit a frame and the percentage of frames that require at least one retransmission.

10. The method of claim 6, wherein the metric representing the application layer includes a downlink of the application layer including calculating a percentage of packets not reaching a decoder in time for play out over a predetermined time interval.

11. The method as defined in claim 6, wherein the metric comprising path quality monitoring of a communication path from terminal to a termination includes transmission of one or more first frames of a predetermined type to a path quality server, reception of one or more second frames from the server responsive to the one or more first frames, and calculation frame transmission characteristics based on the received one or more second frames.

12. The method of claim 1, further comprising:
    evaluating the at least two metrics against respective thresholds to determine quality of service; and
    executing corrective action based on a comparison of at least one metric with a respective threshold.

13. The method as defined in claim 1, where the network is a real time protocol network.

14. The method as defined in claim 1, wherein the communication network includes at least a wireless local area network and a backhaul link.

15. The method as defined in claim 1, further comprising:
    executing a path quality monitoring of a communication path from terminal to a termination includes transmission of one or more first frames of a predetermined type to a path quality server, reception of one or more second frames from the server responsive to the one or more first frames, and calculation frame transmission characteristics based on the received one or more second frames when at least one of the at least two metrics is not determinable.

16. The method as defined in claim 1, further comprising:
    executing a path quality monitoring function when at least one of the at least two metrics indicates a poor quality of service; and
    determining a portion of the communication system causative of the poor quality using the path quality monitoring function.

17. A communication device operable in a communication system, the device comprising:
    a processor including:
        a first module to determine at least two metrics reflective of network parameters in at least two different protocol layers of the communication network, wherein one of the at least two metrics is based on a signal received by a receiver, and wherein the at least two metrics include metrics respectively representing an application layer and a path quality monitoring of a communication path from a terminal to a termination;
        a second module to compare the at least two metrics with respective threshold values, wherein one of the respective threshold values is based on a data rate of an access point of the network and a sensitivity of the receiver; and
        a third module to determine quality of service for the network based on the comparison of the at least two metrics with the respective threshold values.

18. The communication device as defined in claim 17, wherein the processor further includes:
    a fourth module to execute a corrective action to improve QoS based on the quality of service determination.

19. The communication device as defined in claim 18, wherein the corrective action includes one or more of initiating a handoff of a communication terminal from the communication network to another communication network, changing a coding rate, managing interferences, increasing a transmit power, enabling multiple input-multiple output (MIMO), dropping a current call, and requesting a higher QoS from a call service provider.

20. The communication device as defined in claim 19, wherein the another communication network is one of a wireless wide area network or a wireless local area network.

21. The communication device as defined in claim 18, wherein the processor further comprises:
    a fourth module to execute a path quality monitoring function when at least one of the at least two metrics indicates a poor quality of service;
    a fifth module to determine whether a portion of the communication system is causing the poor quality using the path quality monitoring function; and
    a sixth module to prevent execution of corrective action when the poor quality is determined as not being caused by a portion of the communication system.

22. The communication device as defined in claim 17, wherein the at least two metrics further include metrics respectively representing a physical layer and a MAC layer.

23. The communication device as defined in claim 22, wherein the metric representing a physical layer includes measurement of a received signal power or a signal to interference and noise ratio over a number of samples received, the samples corresponding to at least one of data, control, or management frames originated by an access point.

24. The communication device as defined in claim 22, wherein the metric representing a MAC layer include a downlink of the MAC layer, and further includes one or more of measuring of a fraction of frames received with an error and calculating a ratio of packets not received properly.

25. The communication device of claim 22, wherein the metric representing a MAC layer include a uplink of the MAC layer, and further includes calculating a percentage of frames lost in a buffer or application of a communication terminal and a percentage of frames lost over the air and the average number of retransmissions required to transmit a frame and the percentage of frames that require at least one retransmission.

26. The communication device of claim 22, wherein the metric representing the application layer includes a downlink of the application layer including calculating a percentage of packets not reaching a decoder in time for play out over a predetermined time interval.

27. The communication device as defined in claim 22, wherein the metric comprising path quality monitoring of a communication path from terminal to a termination includes transmission of one or more first frames of a predetermined type to a path quality server, reception of one or more second frames from the server responsive to the one or more first frames, and calculation frame transmission characteristics based on the received one or more second frames.

28. The communication device of claim 17, wherein the processor further comprises:
 a fourth module to evaluate the at least two metrics against respective thresholds to determine quality of service; and
 a fifth module to execute corrective action based on a comparison of at least one metric with a respective threshold.

29. The communication device as defined in claim 17, where the network is a real time protocol network.

30. The communication device as defined in claim 17, wherein the communication network includes at least a wireless local area network and a backhaul link.

31. The communication device as defined in claim 17, wherein the processor further comprises:
 a fourth module to execute a path quality monitoring of a communication path from terminal to a termination includes transmission of one or more first frames of a predetermined type to a path quality server, reception of one or more second frames from the server responsive to the one or more first frames, and calculation frame transmission characteristics based on the received one or more second frames when at least one of the at least two metrics is not determinable.

32. The communication device as defined in claim 17, wherein the processor further comprises:
 a fourth module to execute a path quality monitoring function when at least one of the at least two metrics indicates a poor quality of service; and
 a fifth module to determine a portion of the communication system causative of the poor quality using the path quality monitoring function.

33. An apparatus for determining the quality of a communication link comprising:
 means for determining at least two metrics reflective of network parameters in at least two different protocol layers of the communication network, wherein one of the at least two metrics is based on a signal received by a receiver, and wherein the at least two metrics include metrics respectively representing an application layer and a path quality monitoring of a communication path from a terminal to a termination;
 means for comparing the at least two metrics with respective threshold values, wherein one of the respective threshold values is based on a data rate of an access point of the network and a sensitivity of the receiver; and
 means for determining quality of service for the network based on the comparison of the at least two metrics with the respective threshold values.

34. The apparatus as defined in claim 33, further comprising:
 means for executing a corrective action to improve QoS based on the quality of service determination.

35. The apparatus as defined in claim 34, wherein the corrective action includes one or more of initiating a handoff of a communication terminal from the communication network to another communication network, changing a coding rate, managing interferences, increasing a transmit power, enabling multiple-input multiple-output (MIMO), dropping a current call, and requesting a higher QoS from a call service provider.

36. The apparatus as defined in claim 35, wherein the another communication network is one of a wireless wide area network or a wireless local area network.

37. The apparatus as defined in claim 34, further comprising:
 means for executing a path quality monitoring function when at least one of the at least two metrics indicates a poor quality of service;
 means for determining whether a portion of the communication system is causing the poor quality using the path quality monitoring function; and
 means for preventing execution of corrective action when the poor quality is determined as not being caused by a portion of the communication system.

38. The apparatus as defined in claim 33, wherein the at least two metrics further include metrics respectively representing a physical layer and a MAC layer.

39. The apparatus as defined in claim 38, wherein the metric representing a physical layer includes measurement of a received signal power or a signal to interference and noise ratio over a number of samples received, the samples corresponding to at least one of data, control, or management frames originated by an access point.

40. The apparatus as defined in claim 38, wherein the metric representing a MAC layer include a downlink of the MAC layer, and further includes one or more of measuring of a fraction of frames received with an error and calculating a ratio of packets not received properly.

41. The apparatus of claim 38, wherein the metric representing a MAC layer include a uplink of the MAC layer, and further includes calculating a percentage of frames lost in a buffer or application of a communication terminal and a percentage of frames lost over the air and the average number of retransmissions required to transmit a frame and the percentage of frames that require at least one retransmission.

42. The apparatus of claim 38, wherein the metric representing the application layer includes a downlink of the application layer including calculating a percentage of packets not reaching a decoder in time for play out over a predetermined time interval.

43. The apparatus as defined in claim 38, wherein the metric comprising path quality monitoring of a communication path from terminal to a termination includes transmission of one or more first frames of a predetermined type to a path quality server, reception of one or more second frames from the server responsive to the one or more first frames, and calculation frame transmission characteristics based on the received one or more second frames.

44. The apparatus of claim 33, further comprising:
 means for evaluating the at least two metrics against respective thresholds to determine quality of service; and
 means for executing corrective action based on a comparison of at least one metric with a respective threshold.

45. The apparatus as defined in claim 33, where the network is a real time protocol network.

46. The apparatus as defined in claim 33, wherein the communication network includes at least a wireless local area network and a backhaul link.

47. The apparatus as defined in claim 33, further comprising:
 means for executing a path quality monitoring of a communication path from terminal to a termination includes transmission of one or more first frames of a predetermined type to a path quality server, reception of one or more second frames from the server responsive to the one or more first frames, and calculation frame transmission characteristics based on the received one or more second frames when at least one of the at least two metrics is not determinable.

48. The apparatus as defined in claim 33, further comprising:
    means for executing a path quality monitoring function when at least one of the at least two metrics indicates a poor quality of service; and
    means for determining a portion of the communication system causative of the poor quality using the path quality monitoring function.

49. A computer program product, comprising:
    a non-transitory computer-readable medium comprising:
        code for causing a computer to determine at least two metrics reflective of network parameters in at least two different protocol layers of the communication network, wherein one of the at least two metrics is based on a signal received by a receiver, and wherein the at least two metrics include metrics respectively representing an application layer and a path quality monitoring of a communication path from a terminal to a termination;
        code for causing a computer to compare the at least two metrics with respective threshold values, wherein one of the respective threshold values is based on a data rate of an access point of the network and a sensitivity of the receiver; and
        code for causing a computer to determine quality of service for the network based on the comparison of the at least two metrics with the respective threshold values.

50. The computer program product as defined in claim 49, wherein the non-transitory computer-readable medium further comprises:
    code for causing a computer to execute a corrective action to improve QoS based on the quality of service determination.

51. The computer program product as defined in claim 50, the non-transitory computer-readable medium further comprising:
    code for causing a computer to execute a path quality monitoring function when at least one of the at least two metrics indicates a poor quality of service;
    code for causing a computer to determine whether a portion of the communication system is causing the poor quality using the path quality monitoring function; and
    code for causing a computer to prevent execution of corrective action when the poor quality is determined as not being caused by a portion of the communication system.

52. The computer program product as defined in claim 49, wherein the corrective action includes one or more of initiating a handoff of a communication terminal from the communication network to another communication network, changing a coding rate, managing interferences, increasing a transmit power, enabling multiple input-multiple output (MIMO), dropping a current call, and requesting a higher QoS from a call service provider.

53. The computer program product as defined in claim 52, wherein the another communication network is one of a wireless wide area network or a wireless local area network.

54. The computer program product as defined in claim 49, wherein the at least two metrics further include metrics respectively representing a physical layer and a MAC layer.

55. The computer program product as defined in claim 54, wherein the metric representing a physical layer includes measurement of a received signal power or a signal to interference and noise ratio over a number of samples received, the samples corresponding to at least one of data, control, or management frames originated by an access point.

56. The computer program product as defined in claim 54, wherein the metric representing a MAC layer include a downlink of the MAC layer, and further includes one or more of measuring of a fraction of frames received with an error and calculating a ratio of packets not received properly.

57. The computer program product as defined in claim 54, wherein the metric representing a MAC layer include a uplink of the MAC layer, and further includes calculating a percentage of frames lost in a buffer or application of a communication terminal and a percentage of frames lost over the air and the average number of retransmissions required to transmit a frame and the percentage of frames that require at least one retransmission.

58. The computer program product as defined in claim 54, wherein the metric representing the application layer includes a downlink of the application layer including calculating a percentage of packets not reaching a decoder in time for play out over a predetermined time interval.

59. The computer program product as defined in claim 54, wherein the metric comprising path quality monitoring of a communication path from terminal to a termination includes transmission of one or more first frames of a predetermined type to a path quality server, reception of one or more second frames from the server responsive to the one or more first frames, and calculation frame transmission characteristics based on the received one or more second frames.

60. The computer program product as defined in claim 49, the non-transitory computer-readable medium further comprising:
    code for causing a computer to evaluate the at least two metrics against respective thresholds to determine quality of service; and
    code for causing a computer to execute corrective action based on a comparison of at least one metric with a respective threshold.

61. The computer program product as defined in claim 49, where the network is a real time protocol network.

62. The computer program product as defined in claim 49, wherein the communication network includes at least a wireless local area network and a backhaul link.

63. The computer program product as defined in claim 49, the non transitory computer-readable medium further comprising:
    code for causing a computer to execute a path quality monitoring of a communication path from terminal to a termination includes transmission of one or more first frames of a predetermined type to a path quality server, reception of one or more second frames from the server responsive to the one or more first frames, and calculation frame transmission characteristics based on the received one or more second frames when at least one of the at least two metrics is not determinable.

64. The computer program product as defined in claim 49, the non-transitory computer-readable medium further comprising:
    code for causing a computer to execute a path quality monitoring function when at least one of the at least two metrics indicates a poor quality of service; and
    code for causing a computer to determine a portion of the communication system causative of the poor quality using the path quality monitoring function.

* * * * *